(12) United States Patent
Zhang (10) Patent No.: US 11,922,804 B1
(45) Date of Patent: Mar. 5, 2024

(54) SYSTEM AND METHOD FOR TRAFFIC SITUATION INSIGHT

(71) Applicant: GM Global Technology Operations LLC, Detroit, MI (US)

(72) Inventor: Yuan Zhang, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/822,896

(22) Filed: Aug. 29, 2022

(30) Foreign Application Priority Data

Aug. 12, 2022 (CN) ......................... 202210965603.X (51) Int. Cl.
*G08G 1/01* (2006.01)
*H04W 4/44* (2018.01)

(52) U.S. Cl.
CPC ......... *G08G 1/0141* (2013.01); *G08G 1/0116* (2013.01); *G08G 1/0129* (2013.01); *G08G 1/0133* (2013.01); *G08G 1/0145* (2013.01); *H04W 4/44* (2018.02)

(58) Field of Classification Search
CPC .. G08G 1/0141; G08G 1/0116; G08G 1/0129; G08G 1/0133; G08G 1/0145; H04W 4/44
USPC ......................................................... 340/905
See application file for complete search history.

(56) References Cited

U.S. PATENT DOCUMENTS

| | | | | |
|---|---|---|---|---|
| 11,753,033 B2 * | 9/2023 | Jeong | ................ | B60W 30/0956 701/26 |
| 2010/0082227 A1 * | 4/2010 | Posner | ............. | G08G 1/096775 701/118 |
| 2013/0150089 A1 * | 6/2013 | Kuwahara | ............... | A63F 13/79 455/456.3 |
| 2017/0365166 A1 * | 12/2017 | Lu | ......................... | G08G 1/0112 |
| 2018/0174449 A1 * | 6/2018 | Nguyen | ................. | G08G 1/015 |
| 2019/0303686 A1 * | 10/2019 | Guo | ....................... | G06V 10/75 |
| 2019/0391582 A1 * | 12/2019 | Jung | ..................... | G05D 1/0088 |
| 2020/0041997 A1 * | 2/2020 | Tuukkanen | .......... | G05D 1/0088 |
| 2020/0126415 A1 * | 4/2020 | Lin | .................. | G08G 1/096775 |
| 2020/0178198 A1 * | 6/2020 | Ding | ..................... | H04W 60/04 |
| 2020/0245103 A1 * | 7/2020 | Lee | .......................... | H04W 4/08 |
| 2020/0256697 A1 * | 8/2020 | Pfadler | ................ | G05D 1/0212 |
| 2020/0313959 A1 * | 10/2020 | Higuchi | ................ | H04W 48/18 |
| 2020/0314614 A1 * | 10/2020 | Moustafa | ................ | H04L 67/34 |
| 2020/0342750 A1 * | 10/2020 | Sakr | ..................... | G05D 1/0276 |
| 2020/0365015 A1 * | 11/2020 | Nguyen | ............... | G08G 1/0129 |
| 2021/0049907 A1 * | 2/2021 | Dhillon | .................... | H04W 4/44 |
| 2021/0233395 A1 * | 7/2021 | Rocha | .................... | G08G 1/052 |
| 2021/0281968 A1 * | 9/2021 | Kurehashi | ............... | H04W 4/90 |
| 2022/0028264 A1 * | 1/2022 | Lund | ............... | G08G 1/096783 |
| 2022/0030430 A1 * | 1/2022 | Lund | .................... | H04W 12/033 |
| 2022/0108610 A1 * | 4/2022 | Dhillon | ............... | B60W 30/143 |
| 2022/0239743 A1 * | 7/2022 | Khajavi | .................. | G06F 9/546 |

(Continued)

*Primary Examiner* — Kerri L McNally
*Assistant Examiner* — Thang D Tran
(74) *Attorney, Agent, or Firm* — Vivacqua Crane PLLC (57) ABSTRACT

A method of utilizing basic safety messages (BSMs) to provide insight of traffic situations to a vehicle-to-everything (V2X) enabled vehicle includes one or more of the following: transmitting BSMs from on-road vehicles; forwarding V2X messages including BSMs to a multi-access edge computing (MEC) server; extracting data samples from the V2X messages including BSMs; generating statistical results from the extracted data samples; and visualizing the statistical results for a driver of the vehicle.

20 Claims, 5 Drawing Sheets

(56) References Cited

U.S. PATENT DOCUMENTS

| | | | | |
|---|---|---|---|---|
| 2022/0319311 A1* | 10/2022 | Yousaf | ................. | G08G 1/0141 |
| 2023/0107147 A1* | 4/2023 | Song | .................... | H04W 72/12 |
| | | | | 370/329 |
| 2023/0224683 A1* | 7/2023 | Song | .................... | H04W 92/18 |
| | | | | 455/414.1 |

\* cited by examiner

SYSTEM AND METHOD FOR TRAFFIC SITUATION INSIGHT

INTRODUCTION

The present disclosure relates to a system and method for providing insight of traffic situations to a driver of a vehicle. More specifically, the present disclosure relates to a system and method for providing insight of traffic situations to a driver of a vehicle-to-everything (V2X) enabled vehicle.

As vehicles continue to evolve, more vehicles are being equipped with systems that allow a vehicle to communicate with other vehicles, for example, through vehicle-to-vehicle (V2V) systems. These systems allow a driver of a vehicle to alter the vehicle's behavior based on information the driver is receiving about the behavior of surrounding vehicles.

While current vehicle communication systems achieve their intended purpose, there is a need for a new and improved system and method for vehicles to communicate beyond surrounding vehicles.

SUMMARY

According to several aspects a method of utilizing basic safety messages (BSM) to provide insight of traffic situations to a vehicle-to-everything (V2X) enabled vehicle includes one or more of the following: transmitting BSMs from on-road vehicles; forwarding BSMs and other V2X messages to a multi-access edge computing (MEC) server; extracting data samples from the BSMs and other V2X messages; generating statistical results from the extracted data samples; and visualizing the statistical results for a driver of the vehicle. In some arrangements, other types of cloud computing servers are utilized instead of the MEC server, while for simplicity the term "MEC" refers to any capable cloud computing server.

In an additional aspect of the present disclosure, road-side sensors transmit perception data to road-side units (RSU).

In another aspect of the present disclosure, the RSU forwards information to the MEC.

In another aspect of the present disclosure, the MEC analyzes sample distributions of potentially useful data element during a spatial-temporal range.

In another aspect of the present disclosure, the method further includes transmitting the sample distributions to the RSU.

In another aspect of the present disclosure, the sample distributions are indicative of a traffic situation with a pre-determined confidence level.

In another aspect of the present disclosure, the method further includes transmitting the sample distributions to cellular networks.

In another aspect of the present disclosure, the cellular networks forward statistical results from the MEC to other vehicles.

In another aspect of the present disclosure, the RSU forwards statistical results from the MEC to other vehicles.

According to several aspects, a method of utilizing basic safety messages (BSM) to provide insight of traffic situations to a vehicle-to-everything (V2X) enabled vehicle includes one or more of the following: road-side units (RSU) as V2X messages; forwarding the BSMs and other V2X messages to a multi-access edge computing (MEC) server; extracting data samples from the BSMs and other V2X messages; generating statistical results from the extracted data samples; and visualizing the statistical results for a driver of the vehicle.

In another aspect of the present disclosure, road-side sensors transmit the perception data to the RSU.

In another aspect of the present disclosure, the MEC analyzes sample distributions of potentially useful data element during a spatial-temporal range.

In another aspect of the present disclosure, the method further includes transmitting the sample distributions to the RSU.

In another aspect of the present disclosure, the sample distributions are indicative of a traffic situation with a pre-determined confidence level.

In another aspect of the present disclosure, the method further includes transmitting the sample distributions to cellular networks.

In another aspect of the present disclosure, the cellular networks forward statistical results from the MEC to other vehicles.

In another aspect of the present disclosure, the RSU forwards statistical results from the MEC to other vehicles.

According to several aspects, a method of utilizing basic safety messages (BSM) to provide insight of traffic situations to a vehicle-to-everything (V2X) enabled vehicle includes one or more of the following: road-side units (RSU) as V2X messages; forwarding the BSMs and other V2X messages to a multi-access edge computing (MEC) server; extracting data samples from the BSMs and other V2X messages; generating statistical results from the extracted data samples; and visualizing the statistical results for a driver of the vehicle. The MEC server or other type of cloud computing server analyzes sample distributions of potentially useful data element during a spatial-temporal range In another aspect of the present disclosure, the method further includes transmitting the sample distributions to the RSU or cellular networks.

In another aspect of the present disclosure, statistical results are transmitted to other vehicles.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
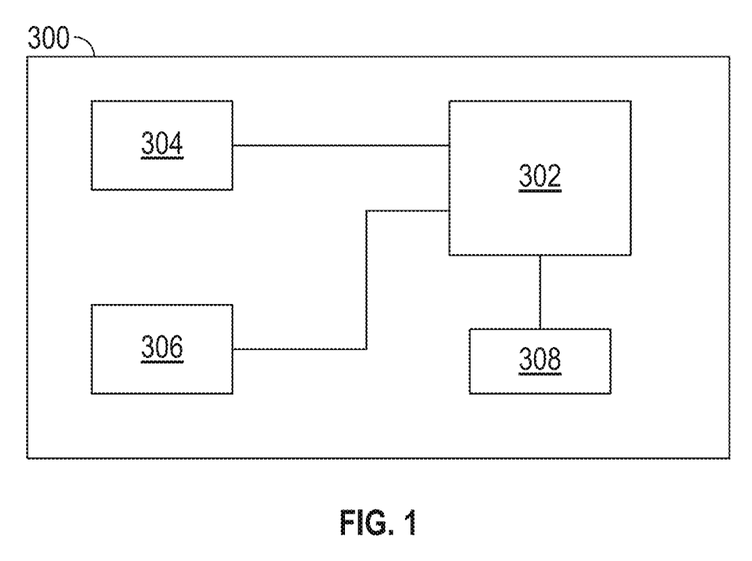
FIG. 1 is a block diagram of a vehicle-to-everything (V2X) enabled vehicle according to an exemplary embodiment.

Referring to FIG. 1, there is shown a vehicle-to-everything (V2X) equipped vehicle 300 with the capability of utilizing basic safety messages (BSM) to provide insight of traffic situations. The vehicle 300 in various arrangements is a non-motorized or motorized vehicle, including, but not limited to, bicycles, motorcycles, buses, trucks, watercraft, aircraft and cars. The vehicle 300 includes an electronic control unit (ECU) 302 that communicates with a receiver 304. Further, the vehicle 300 includes a set of sensors 308 that acquires information about the situation of the vehicle 300 and a transmitter 306 that sends information about the vehicle 300. In various implementations, the vehicle receives BSMs from other vehicles and road-side units (RSU) with the receiver 304. In various implementations, the vehicle 300 communicates with a multi-access edge computing (MEC) server to relay information about the vehicle 300 as well as receive information about the vehicle's 300 environment. Note that there may be other types of cloud computing server utilized instead of the MEC server, while for simplicity the term "MEC" to refers to any capable cloud computing server in the present disclosure.

The ECU 302 is a non-generalized, electronic control device having a preprogrammed digital computer or processor with memory or non-transitory computer readable medium employed to store data such as control logic, software applications, instructions, computer code, data, lookup tables, etc., and a transceiver. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code. The ECU 302 is configured to execute the code or instructions. Further, the receiver 304 and transmitter 306 are configured to wirelessly communicate using Wi-Fi protocols under IEEE 802.11x.

The ECU 302 further includes one or more applications. An application is a software program configured to perform a specific function or set of functions. The application, in various applications, include one or more computer programs, software components, sets of instructions, procedures, functions, objects, classes, instances, related data, or a portion thereof adapted for implementation in a suitable computer readable program code. The applications, in certain implementations, are stored within the memory or in additional or separate memory.

The vehicle 300 utilizes BSM sent from on-road vehicles and other V2X messages for the vehicles to gather insights about inferable traffic situations for some intermediate distance ahead. The vehicles are supported by the RSUs and the MEC server that receives the forwarded V2X messages from associate RSUs. Typically, based on the extraction of relevant data elements (for example, vehicle speed and steering angle), the MEC server performs a statistical analysis and identifies the sample distributions that may imply certain temporary traffic situations at some sufficient confidence level. The MEC server conveys these statistical data to the potentially impacted vehicles through V2X messages. Upon receiving the messages, the statistical data is visualized according to the driver's desired configurations of the minimum confidence level and visualization format. As such, insight about the traffic situation is presented to each driver's preferred level of certainty as well as visual style.

Figure 2:
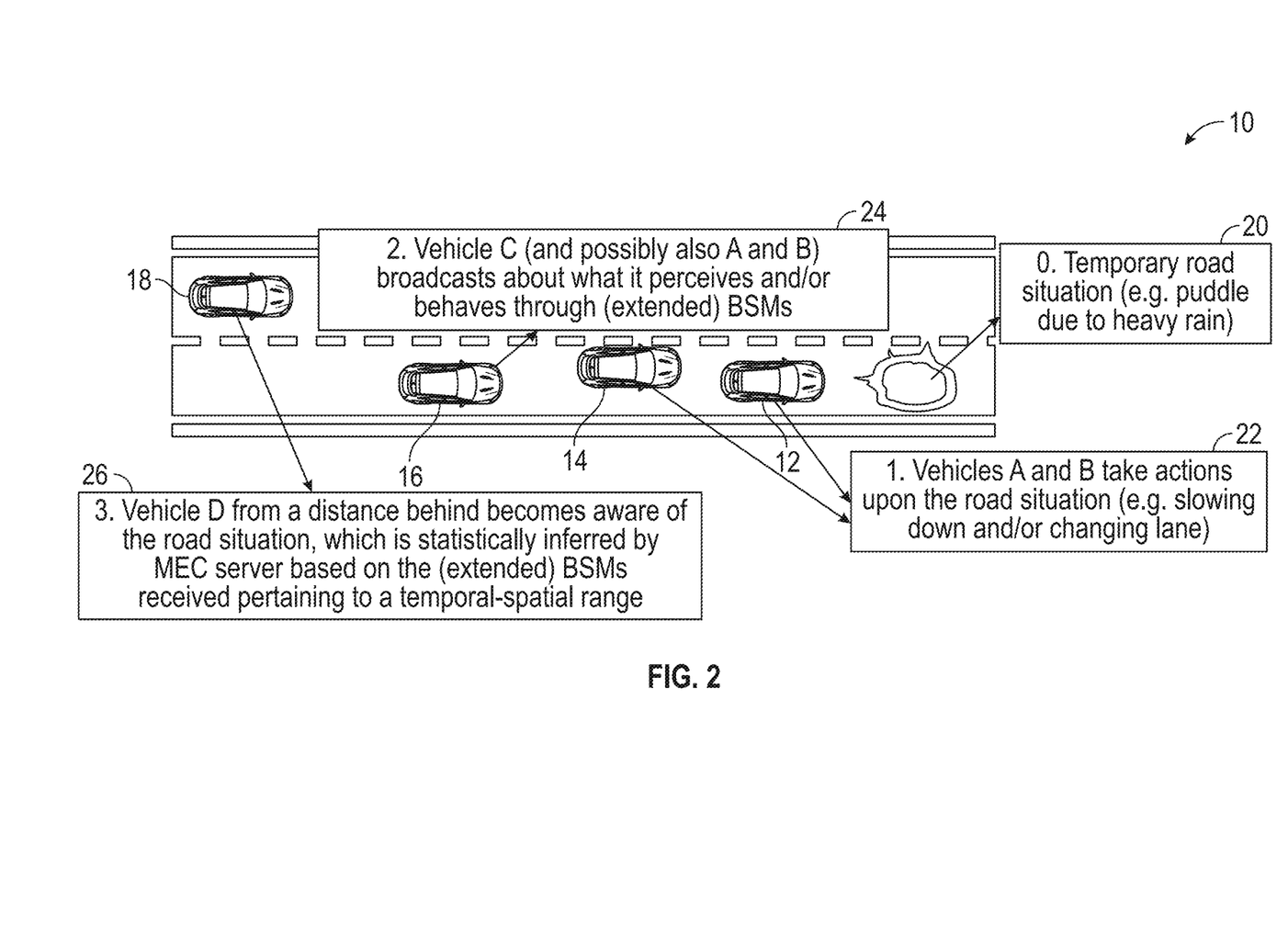
FIG. 2 is an overview diagram of V2X-enabled vehicles encountering a temporary road condition according to an exemplary embodiment.

Referring now to FIG. 2, there is shown a set of vehicles (vehicle A) 12, (vehicle B) 14, (vehicle C) 16 and (vehicle D) 18, all of which are equipped with the ability to receive BSMs and communicate with a MEC server. In the example shown in FIG. 2, vehicle A encounters a temporary road situation 20, for example, a puddle that occurs during heavy rain. Next 22, vehicles A and B take action in view of the road situation 20. Meanwhile 24, vehicle C (and possibly vehicles A and B) broadcasts what vehicle C perceives and/or behaves through BSMs. Finally, 26, vehicle D from a distance behind vehicles A, B and C becomes aware of the road situation 20, which is inferred by the MEC server based on the BSMs received by the vehicle D pertaining to a temporal-spatial range.

With a sufficient number of vehicles (for example, vehicles A, B and C) going through a particular location, the MEC server obtains sufficient amount of raw data samples (of data elements like vehicle speed, steering angle etc.), which are extracted from the vehicle originated BSMs. Based on a statistical analysis performed by the MEC server, the MEC server determines a distribution indicative of the temporary road situation (for example, puddle from heavy rain) with sufficiently high confidence (for example, >=0.6).

The MEC server conveys the sample distributions that have sufficiently high confidence and are indicative of the temporary road situation to potentially impacted vehicles. Potentially impacted vehicles, such as vehicle D, which are an intermediate distance behind the on-going road situation receives the MEC provided statistical results (possibly with updates for a particular duration) and visualizes (FIGS. 4, 5A and 5B) these results to the vehicle's driver subject to the condition that the confidence of the results is no lower than the driver configured threshold. The driver of vehicle D becomes aware of the predicted traffic situation and is able to prepare appropriate maneuvering actions based on the intuitive visualization, without the need to know the exact type of event that appears to be occurring some distance ahead.

Figure 3:
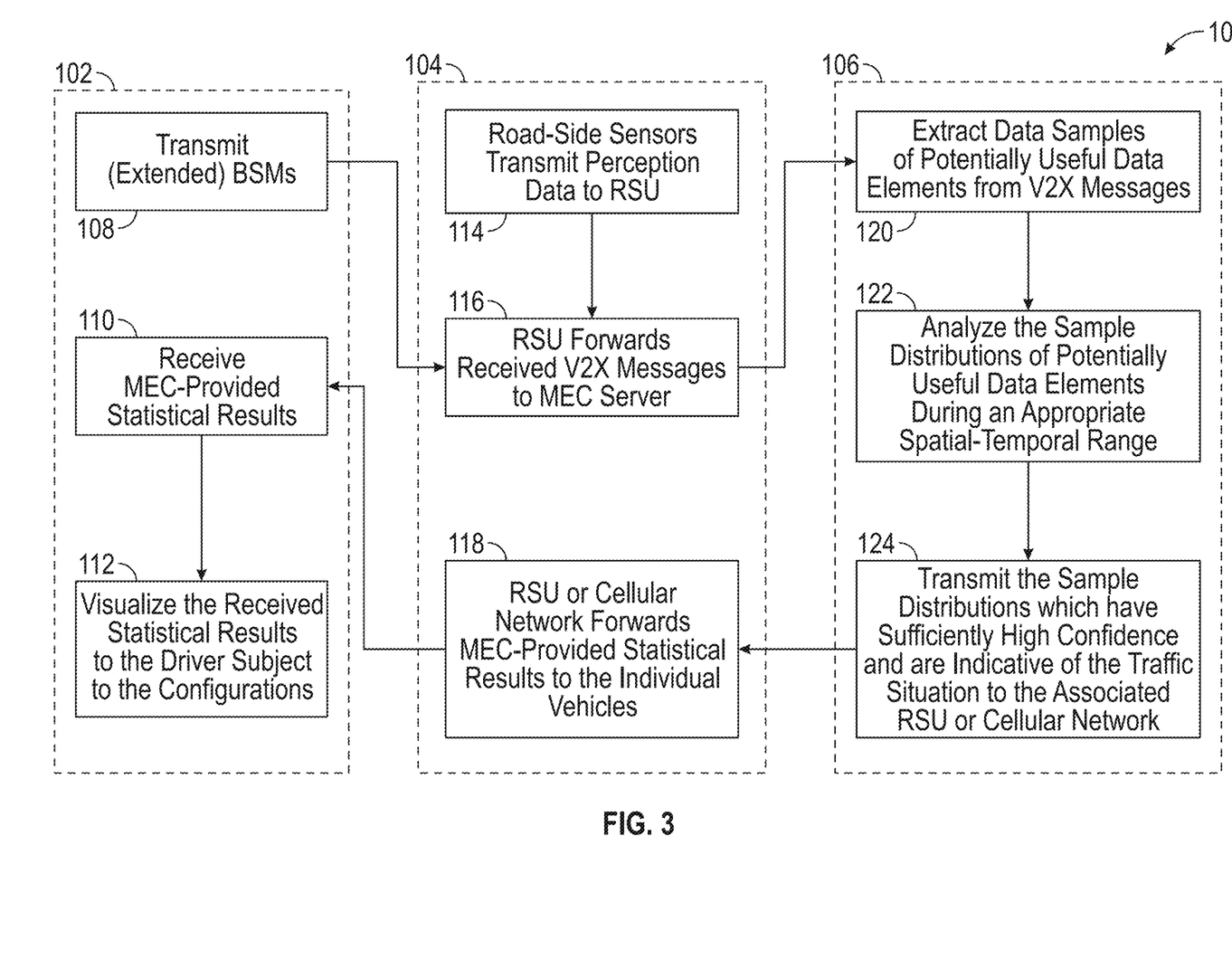
FIG. 3 is a flow diagram of the operation of a V2X-enabled vehicle according to an exemplary embodiment.

Referring further to FIG. 3, there is shown a flow diagram 100 that illustrates the operation of a V2X vehicle 102 that communicates with a MEC server 106 through proxies and auxiliary sources of messages 104. The vehicle 102 transmits BSMs in step 108 and road-side sensors transmit perception data to a RSU in step 114. In step 116, the RSU forwards the received V2X messages to the MEC server 106. The MEC server 106 extracts data samples of potentially useful data elements from the V2X messages in step 120. In step 122, the MEC server analyzes the sample distributions of potentially useful data elements during an appropriate spatial-temporal range. In step 124, the MEC server 106 transmits the sample distributions which have sufficiently high confidence and are indicative of the traffic situation to the RSU or to a cellular network.

In step 118, the RSU or cellular network forwards MEC provided statistical results to individual vehicles. In step 110, the V2X enable vehicle 102 receives the MEC provided statistical results. The statistical results are processed so that a driver is able to visually see the results in step 112.

Figure 4:
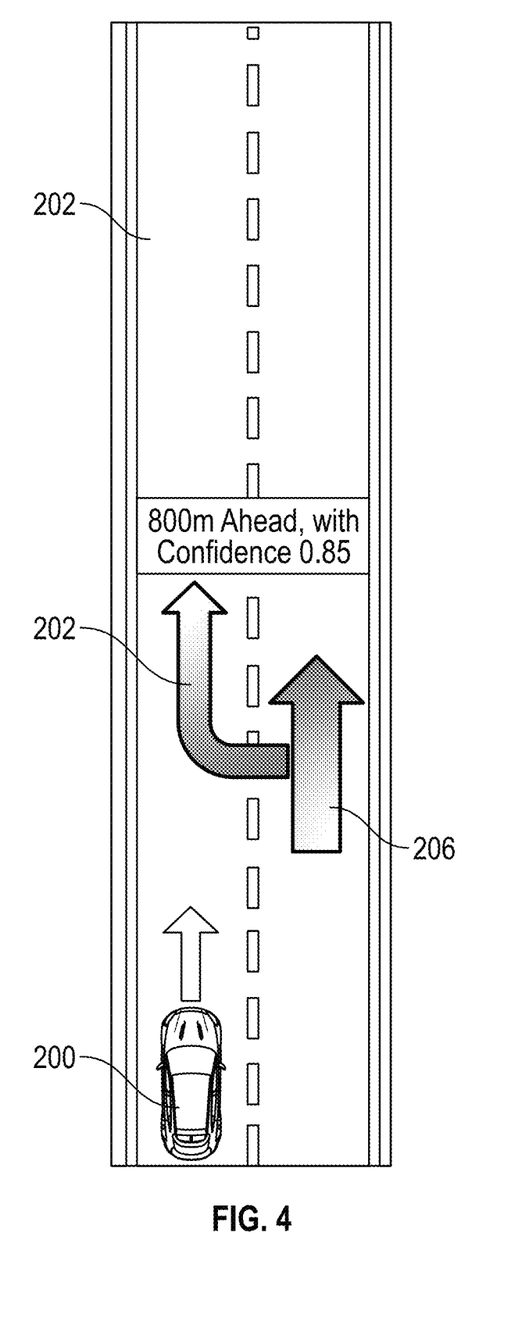
FIG. 4 illustrates a visualization provided to a driver in a V2X-enabled vehicle according to an exemplary embodiment.

Referring now to FIG. 4, there is shown a visualization of MEC provide statistical result to a driver of a vehicle 200 driving along a road 202. The variation of vehicle speed is illustrated by the gradient of the grey scale (or alternatively, the color) of the arrows 202 and 206. The darker grey scale represents lower speed, and the lighter grey scale represents higher speed. The lane change behaviors are inferred based on the sample distributions of steering wheel angle and illustrated by the forking of the arrow 202.

Figure 5A:
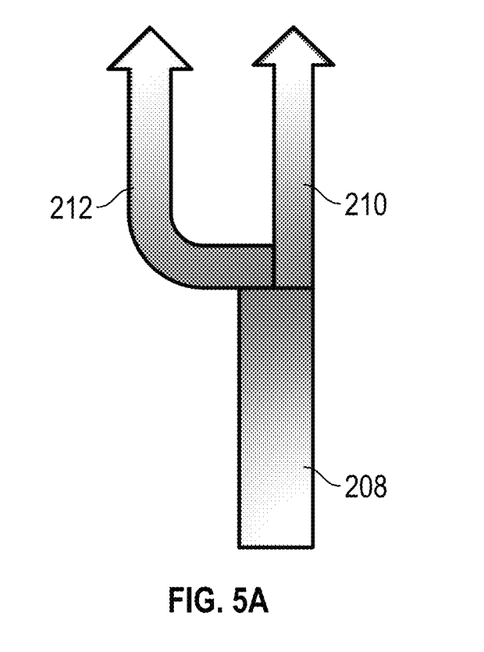
FIGS. 5A and 5B illustrate alternative visualization provide to a driver in a V2X-enabled vehicle according to an exemplary embodiment.
Figure 5B:
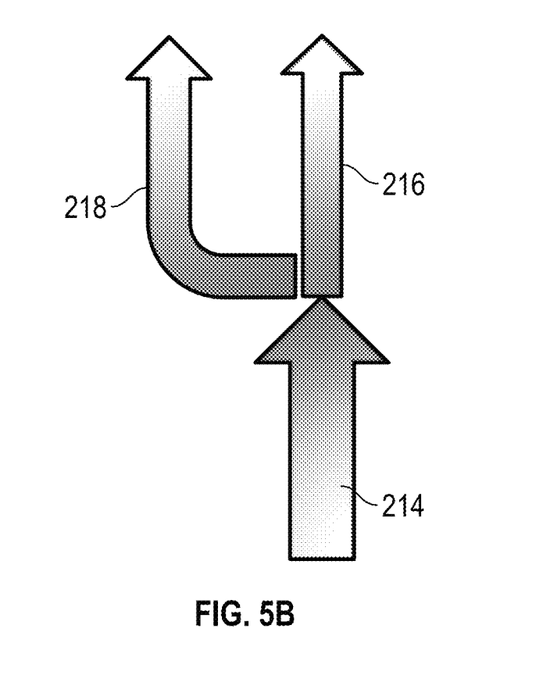

Alternative styles of visualizations are shown in FIGS. 5A and 5B. FIG. 5A, for example, shows a rectangular block 208 followed by two alternative paths 210 and 212, and FIG. 5B shows an arrow 214 followed by two alternative paths 216 and 218. As such, other indications about the traffic flow are incorporated into the graphical attributes of the visualization, such as, for example, the cross-sectional width of some shape representing the number density of on-road vehicles.

A V2X enabled vehicle of the present disclosure offers several advantages. These include making use of BSM (and other pertinent V2X messages) in a spatial-temporal collective and statistical approach to provide insight of the traffic situation ahead of the vehicle. This provides a significant complement to the vehicle-to-vehicle (V2V) based information services. Further, visualization of the inferred traffic situation is provided in an intuitive and explainable manner subject to the driver's configuration on the minimum confidence level and visualization format. The visualization occurs without explicit inference of the event type (that is, neither the MEC server nor the vehicle-side system needs to tell the driver what the exact type of event is expected ahead), so that the statistical result serves its optimal benefit for the driver without being misleading or causing unwanted agitations.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of utilizing basic safety messages (BSMs) to provide insight of traffic situations to a vehicle-to-everything (V2X) enabled vehicle, the method comprising:
   transmitting BSMs from on-road vehicles;
   forwarding V2X messages including BSMs to a multi-access edge computing (MEC) server or other type of cloud computing server;
   extracting data samples from the V2X messages including BSMs;
   generating statistical results from the extracted data samples, wherein the statistical results define one or more distributions that indicate a temporary road situation within a spatial-temporal range of the V2X enabled vehicle; and
   visualizing the statistical results for a driver of the V2X enabled vehicle wherein the statistical results are visually displayed so that variation in vehicle speed is illustrated by a gradient of color within one or more directional arrows, wherein a darker color within the one or more directional arrows represents a lower vehicle speed and a lighter color, lighter than the darker color, represents a higher vehicle speed, wherein lane change behavior is based on distributions of steering wheel angles and displayed as forking of the one or more directional arrows, and wherein a cross-sectional width of the one or more directional arrows represents a density of on-road vehicles.

2. The method of claim 1, wherein road-side sensors transmit perception data to road-side units (RSU).

3. The method of claim 2, wherein the RSU forwards information to the MEC server.

4. The method of claim 3, wherein the MEC server analyzes sample distributions of potentially useful data element during the spatial-temporal range.

5. The method of claim 4, further comprising transmitting the sample distributions to the RSU.

6. The method of claim 4, wherein the sample distributions are indicative of a traffic situation with a pre-determined confidence level.

7. The method of claim 4, further comprising transmitting the sample distributions to cellular networks.

8. The method of claim 7, wherein the cellular networks forward statistical results from the MEC server to other vehicles.

9. The method of claim 2, wherein the RSU forwards statistical results from the MEC server statistical to other vehicles.

10. A method of utilizing basic safety messages (BSMs) to provide insight of traffic situations to a vehicle-to-everything (V2X) enabled vehicle, the method comprising:
    transmitting BSMs from on-road vehicles;
    transmitting perception data from road-side units (RSU) as V2X messages;
    forwarding the V2X messages including BSMs to a multi-access edge computing (MEC) server or other type of cloud computing server;
    extracting data samples from the V2X messages including BSMs;
    generating statistical results from the extracted data samples, wherein the statistical results define one or more distributions that indicate a temporary road situation within a spatial-temporal range of the V2X enabled vehicle; and
    visualizing the statistical results for a driver of the V2X enabled vehicle; wherein the statistical results are visually displayed so that variation in vehicle speed is illustrated by a gradient of color within one or more directional arrows, wherein a darker color within the one or more directional arrows represents a lower vehicle speed and a lighter color, lighter than the darker color, represents a higher vehicle speed, wherein lane change behavior is based on distributions of steering wheel angles and displayed as forking of the one or more directional arrows, and wherein a cross-sectional width of the one or more directional arrows represents a density of on-road vehicles.

11. The method of claim 10, wherein road-side sensors transmit the perception data to the RSU.

12. The method of claim 10, wherein the MEC server analyzes sample distributions of potentially useful data element during the spatial-temporal range.

13. The method of claim 12, further comprising transmitting the sample distributions to the RSU.

14. The method of claim 13, wherein the sample distributions are indicative of a traffic situation with a predetermined confidence level.

15. The method of claim 12, further comprising transmitting the sample distributions to cellular networks.

16. The method of claim 15, wherein the cellular networks forward statistical results from the MEC server to other vehicles.

17. The method of claim 10, wherein the RSU forwards statistical results from the MEC server to other vehicles.

18. A method of utilizing basic safety messages (BSMs) to provide insight of traffic situations to a vehicle-to-everything (V2X) enabled vehicle, the method comprising:
    transmitting BSMs from on-road vehicles;

transmitting perception data from road-side units (RSU) as V2X messages;

forwarding the V2X messages including BSMs to a multi-access edge computing (MEC) server or other type of cloud computing server;

extracting data samples from the V2X messages including BSMs;

generating statistical results from the extracted data samples, wherein the statistical results define one or more distributions that indicate a temporary road situation within a spatial-temporal range of the V2X enabled vehicle; and visualizing the statistical results for a driver of the V2X enabled vehicle; wherein the statistical results are visually displayed so that variation in vehicle speed is illustrated by a gradient of color within one or more directional arrows, wherein a darker color within the one or more directional arrows represents a lower vehicle speed and a lighter color, lighter than the darker color, represents a higher vehicle speed, wherein lane change behavior is based on distributions of steering wheel angles and displayed as forking of the one or more directional arrows, and wherein a cross-sectional width of the one or more directional arrows represents a density of on-road vehicles;

wherein the MEC server or other type of cloud computing server analyzes sample distributions of potentially useful data element during the spatial-temporal range.

19. The method of claim 18, further comprising transmitting the sample distributions to the RSU or cellular networks.

20. The method of claim 19, wherein the statistical results are transmitted to other vehicles.

* * * * *